United States Patent [19]

Nishibe et al.

[11] 4,334,467

[45] Jun. 15, 1982

[54] ROTARY BALER WITH SIDE PRESSURE RELEASE

[75] Inventors: Kazuteru Nishibe, Sapporo; Naoji Furukawa, Hokkaido, both of Japan

[73] Assignee: Farmhand Inc., Grinnell, Iowa

[21] Appl. No.: 159,818

[22] Filed: Jun. 16, 1980

[30] Foreign Application Priority Data

Jun. 22, 1979 [JP] Japan .................. 54-86299

[51] Int. Cl.³ .................................. B30B 5/04
[52] U.S. Cl. ........................... 100/89; 56/341
[58] Field of Search ............ 100/88, 89; 56/16.4, 56/341, 343, 344

[56] References Cited

U.S. PATENT DOCUMENTS

| | | | |
|---|---|---|---|
| 567,548 | 9/1896 | Owen | 100/86 |
| 699,114 | 4/1902 | Reagan | 100/89 X |
| 900,205 | 10/1908 | Reagan | 100/89 |
| 980,706 | 1/1911 | Treese | 100/89 |
| 3,848,526 | 11/1974 | Mast | 100/88 |
| 4,009,653 | 3/1977 | Sacht | 100/88 |
| 4,103,475 | 8/1978 | Kampman et al. | 56/16.4 |
| 4,121,513 | 10/1978 | Kopaska | 100/88 |

Primary Examiner—Billy J. Wilhite
Attorney, Agent, or Firm—Wegner, McCord, Wood & Dalton

[57] ABSTRACT

A baling apparatus of the type which is moved along a windrow of fodder and rolls a large bale in a baling chamber which has side plates to confine the ends of the bale. One side plate is mounted for lateral translatory movement, provided by a hydraulic cylinder unit, so as to reduce the confining pressure on the bale at the time of bale discharge. Bale formation and discharge are also improved by providing the baling chamber with a set of closely spaced, transversely extending rotatable rollers which support the bale during bale formation and discharge.

7 Claims, 3 Drawing Figures

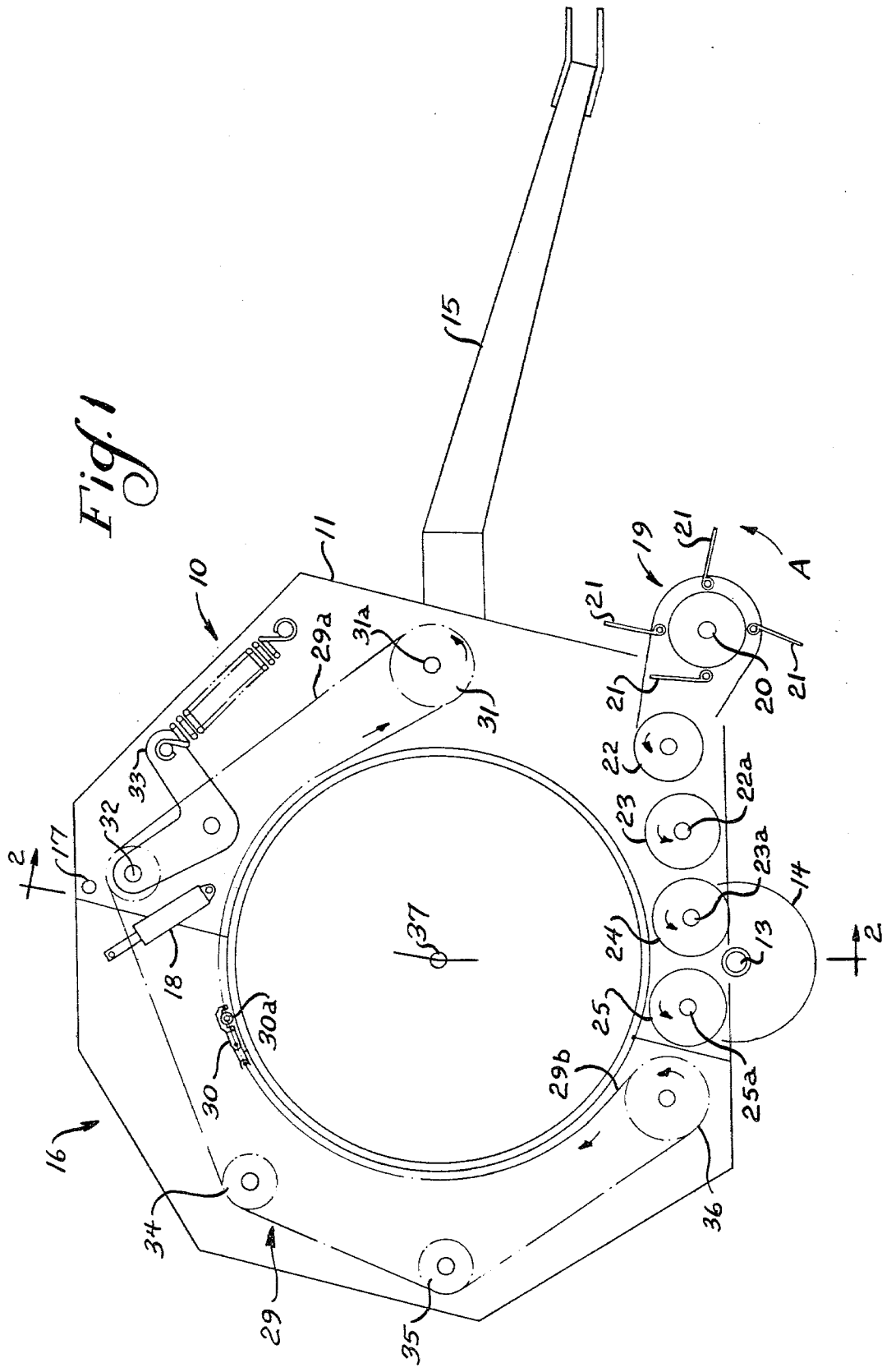

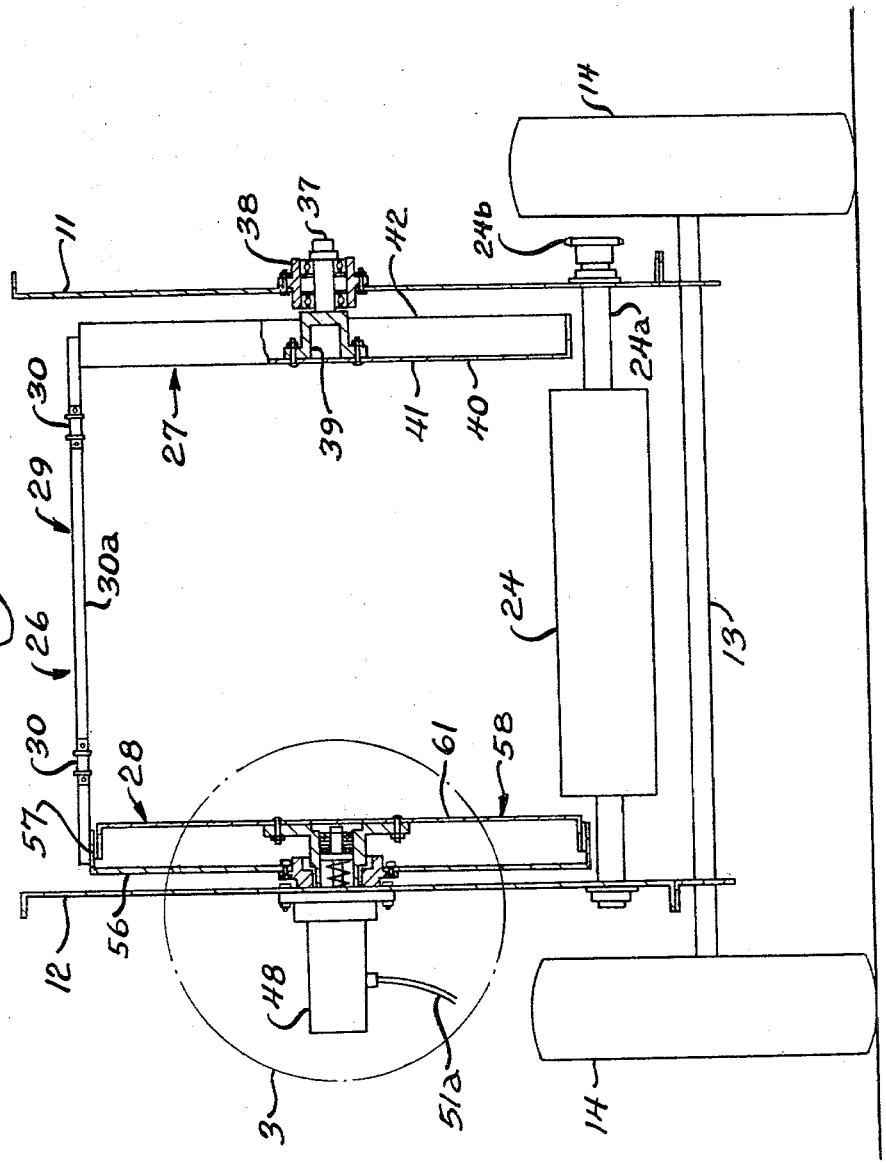

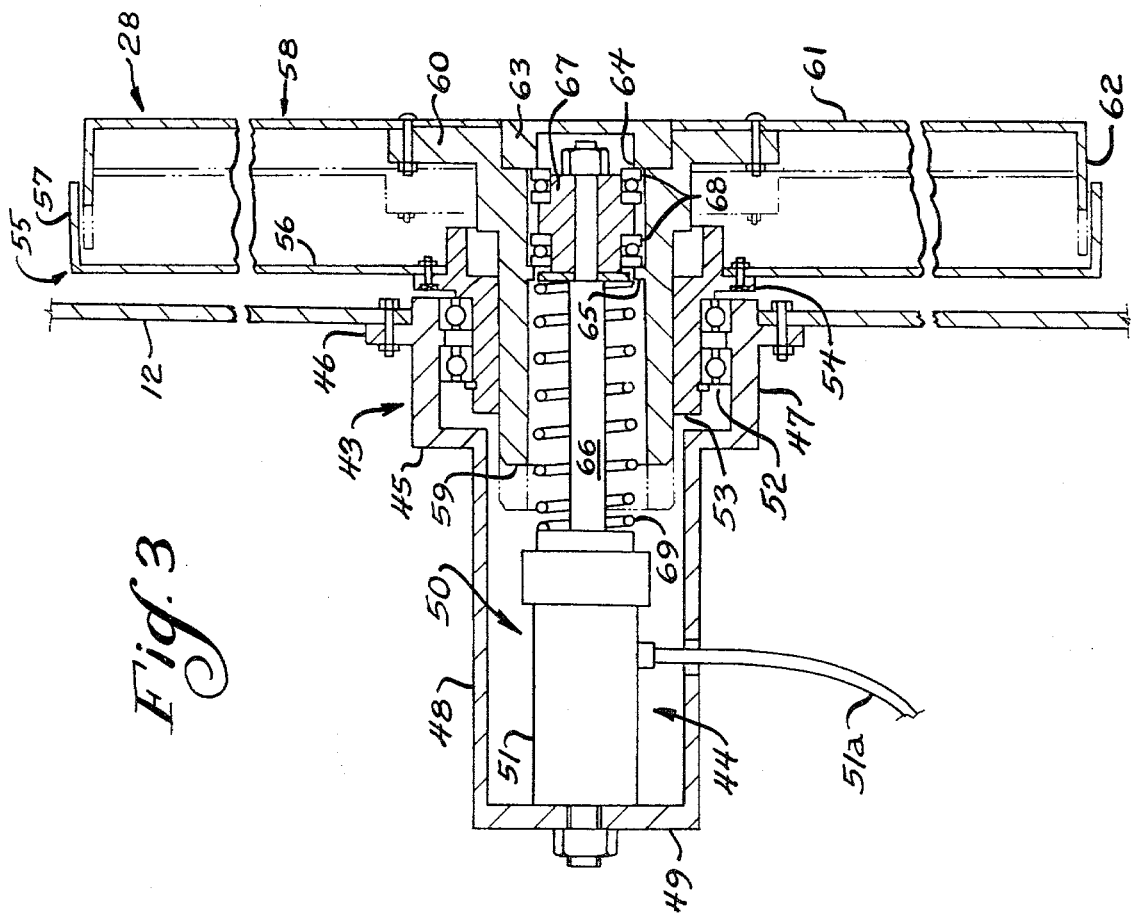

ROTARY BALER WITH SIDE PRESSURE RELEASE

BACKGROUND OF THE INVENTION

During a period commencing in the early 1960's, a great deal of development work has been done upon balers which form large, cylindrical bales of hay or other forage crops, either by rolling a windrow of hay into a bale on the ground, as by feeding the windrow into a baling chamber and rolling the bale in the chamber. Either type of apparatus may be used to produce bales which are four or five feet in diameter and six or eight feet long, and which weigh up to several tons.

Formation of a satisfactory bale requires that the ends of the bale (the sides relative to the line of travel of the baler) be confined between smooth metal plates which form the sides of the baling chamber so as to minimize the amount of material projecting from the ends of the bale. A preferred baler structure for accomplishing this is the rotatable discs disclosed in U.S. Pat. No. 4,103,475 which are there illustrated in a ground engaging baler but which are equally applicable to a chamber type baler of the general type disclosed in U.S. Pat. No. 3,848,526.

Confining the ends of the bale between smooth metal plates that define the sides of the baling chamber has a tendency to interfere with the release of a finished bale from the baling chamber, and at least in the case of a chamber type baler it increases a power required to discharge the bale.

SUMMARY OF THE INVENTION

The invention relates to an improved baling apparatus of the type which includes a wheeled frame adapted to span a windrow of hay and be moved forwardly therealong, and having two opposed plates mounted at the sides of the frame to define the sides of the baling chamber and confine the ends of a forming bale. There are means in the chamber for forming the windrow into a spiral bale as the apparatus is moved forwardly, such means including endless means which has a lower bale rolling run that may contact hay in the chamber and roll it forwardly, and means for releasing a finished bale for discharge from the chamber. The improvement consists of supporting means mounted on the frame and supporting one of the plates for lateral translatory movement, together with power means which is mounted on the frame and operative to move said one of said plates laterally outwardly from the normal position to reduce confining force on the ends of the bale at the time of bale discharge, and to return said one of said plates to normal position after a bale is discharged.

The improvement is applicable both to an apparatus having rotatably mounted discs which define the sides of the baling chamber, and to an apparatus in which the plates defining the sides of the baling chamber are not rotatable.

In addition to the heretofore described means for reducing confining force on the ends of the bale at the time of bale discharge, a most preferred form of the apparatus includes a plurality of closely spaced, transversely extending, rotatable rollers which define the bottom of the baling chamber.

THE DRAWINGS

FIG. 1 is a schematic, longitudinal view of the apparatus of the invention;

FIG. 2 is a transverse sectional view taken substantially as indicated along the line 2—2 of FIG. 1; and FIG. 3 is a fragmentary sectional view on an enlarged scale, illustrating that part of the apparatus enclosed within the circle 3 of FIG. 2, and also the structure at the periphery of the discs.

DETAILED DESCRIPTION OF THE INVENTION

Referring to the drawings in detail, and referring first to FIGS. 1 and 2, the apparatus of the invention comprises a frame, indicated generally at 10, which includes side frame members 11 and 12 supported upon an axle 13 and ground wheels 14. A draught tongue 15 is adapted for connection to the drawbar of a farm tractor, so that the baling apparatus may be moved forwardly with its wheels 14 straddling a windrow of fodder. As is well known to those skilled in the art, the frame also includes any desired number of transverse frame members, connecting the side frame members 11 and 12, all of which are omitted to simplify the drawings.

At the rear of the frame is a bale discharge gate, indicated generally at 16, which is pivoted at 17 on the frame 10. A pair of hydraulic cylinder units, like the unit 18, swing the gate 16 open and shut.

At the front of the frame 10 is a fodder pickup apparatus, indicated generally at 19, which includes a transverse shaft 20 that is driven in the direction of the arrow A in FIG. 1 and carries a plurality of fodder pickup tines 21 in order to move the fodder in a windrow onto a series of closely spaced, transversely extending driven rollers 22, 23, 24 and 25 having respective cross shafts 22a, 23a, 24a and 25a, all of which are journalled in the side frame members 11 and 12 as illustrated in FIG. 2 for the shaft 24a. All the aforesaid shafts are provided with sprockets such as the sprocket 24b, so the respective rollers 22 to 25 are driven in the direction indicated by the arrows in FIG. 1. The rollers 22 to 25 form the bottom of a baling chamber, indicated generally at 26.

The sides of the baling chamber 26 are defined by side plates which, in the particular embodiment illustrated, take the form of rotatable disks, indicated generally at 27 and 28 in FIG. 2.

Means in the baling chamber for forming a windrow into a spiral bale includes the rollers 22 to 25 which support the fodder in the baling chamber 26; and also includes endless means, indicated generally at 29, which consists of a pair of parallel endless chains 30 connected by raddles 30a.

The chains 30 of the endless means 29 are seen in FIG. 1 to be trained around drive sprockets 31 which are carried upon a drive shaft 31a at the front portion of the frame 10, and an upper run 29a of the endless means passes over movable sprockets 32 which are supported upon spring biased bell cranks 33 pivoted upon the upper rearward parts of the side frame plates 11 and 12, and over idler sprockets 34 and 35 which are supported in side frame members of the discharge gate 16. At the lower end of the gate 16 are sprockets 36, and a lower bale rolling run 29b of the endless means 29 has the extremities of the raddles 30a which constitute the sides of the endless means 29, supported upon rotatable disks 27 and 28.

Referring to FIG. 2, the disk 27 is seen to include a spindle 37 which is journalled in bearing means 38 that is mounted in a hole in the side frame member 11, and at the inner end of the spindle 37 is a flanged boss 39 to which a disk member 40 is fixedly secured. The disk member 40 includes a circular plate 41 which confines an end of a bale, and a peripheral flange 42 which provides one of the supports for the end portions of the raddles 30a in the lower, bale rolling run 29b of the endless means 29.

The principal novel part of the present structure is the arrangement of the disk 28, and in particular the disk mounting means, indicated generally at 43, and the means, indicated generally at 44, for imparting lateral translatory movement to that part of the disk 28 which confines one end of the bale. That structure is illustrated in detail in FIG. 3.

An external housing 45 has a peripheral flange 46 by means of which it is secured to the side frame member 12, and a side wall 47 of the housing has an inner end portion which extends through an opening in the side frame member 12. A lateral cylindrical extension 48 of the housing 45 has an end wall 49; and a hydraulic cylinder unit, indicated generally at 50, which is part of the means 44, has a cylinder 51 fixedly mounted on the housing end wall 49 and connected by a flexible pressure hose 51a to the tractor hydraulic system (not shown).

Mounted in the housing side wall 47 is a bearing means 52 in which an outer sleeve 53 is journalled; and the outer sleeve 53 has a peripheral flange 54 which provides a mounting for an outer disk member 55 that consists of a plate 56 and a peripheral flange 57 which provides the other support for the end portions of the raddles 30a as seen in FIG. 2.

An inner disk member, indicated generally at 58, comprises an inner sleeve 59 which is slidably mounted in the outer sleeve 53; and a large annular web 60 provides a mounting for an inner disk element of the inner disk member 58 that consists of a bale confining plate 61 and a circumferential flange 62 which is positioned immediately inside the flange 57 of the outer disk member 55. A central boss 63 is mounted in an opening in the plate 61 and has an annular web 64 which seats in a recess in the web 60 and provides an inner thrust shoulder which is in spaced relationship to an outer thrust shoulder 65 which is defined by an internal rib in the inner sleeve 59.

The hydraulic cylinder and piston unit 50 includes a piston rod 66 at the free end of which is a thrust block 67, and on the thrust block 67 between the inner thrust shoulder 64 and the outer thrust shoulder 65 are bearing assemblies 68 which permit the inner disk member 58 to rotate freely with the outer sleeve 59 about the piston rod 66 and the hub 67. A compression spring 69 is confined between the end of the cylinder 51 and the thrust block 67.

In operation, fodder in a windrow is picked up by the tines 21 and fed toward the rear of the baler by the rotating rollers 22 to 25, which serve as conveyor means. The windrow is rolled into a bale, the ends of which are closely confined between the plate 41 of the disk member 40 and the plate 61 of the inner disk member 58.

When the time comes to discharge the formed bale from the baling chamber 26, a hydraulic flow control valve of the tractor (not shown) is moved to charge the hydraulic cylinder 18 and open the gate 16. The conveyor means provided by the rollers 22 to 25 continues to be driven, but the continuous baling means 29 is stopped by disengaging a clutch (not shown).

At the same time, the hydraulic pressure from the tractor hydraulic system is transmitted through the hose 51a to the cylinder 51 to retract the piston rod 66 against the bias of the compression spring 69. The thrust block 67, acting against the outer thrust shoulder 65, moves the inner disk member 58 from the full line position to the broken line position of FIG. 3, thereby releasing side pressure upon the ends of the bale and making it easier to discharge the finished bale from the baling chamber.

When the bale is discharged, the tractor flow control valve is again moved to cause the hydraulic cylinder 18 to close the gate 16, and to bleed hydraulic fluid from the cylinder 51, permitting the compression spring 69 to act through the thrust block 67 and the inner thrust shoulder 64 to return the inner disk member 68 to the full line position of FIG. 3, which is its normal position.

Release of side pressure from the ends of the finished bale is more important with certain types of fodder material than with others. Generally speaking, the benefit of the side pressure release is greatest with stiff forage materials and least with those which are softest. Rice straw and cornstalks are two examples of stiff materials with which the release of side pressure is the most important.

The foregoing detailed description has been given for clearness of understanding only and no unnecessary limitations should be understood therefrom as modifications will be obvious to those skilled in the art.

We claim:

1. In a baling apparatus of the type which includes a wheeled frame adapted to span a windrow of hay and be moved forwardly therealong, two opposed plates mounted at the sides of said frame to define the sides of a baling chamber and confine the ends of a forming bale, means in said chamber for forming the windrow into a spiral bale as the apparatus is moved forwardly, said means including endless means which has a lower bale rolling run that may contact hay in the chamber and roll it forwardly, and means for releasing a finished bale for discharge from said chamber, the improvement comprising:

guide means mounted on the frame;
  a boss to which the central part of one of said plates is affixed, said boss being mounted for lateral movement in said guide means;
  and a hydraulic cylinder unit mounted on the frame with a piston rod operatively connected to the boss to move said one of said plates laterally outwardly from a normal position to reduce confining force on the ends of the bale at the time of bale discharge, and to return said one of said plates to normal position after a bale is discharged.

2. The improvement of claim 1 in which the power means also includes a compression spring biasing said one of said plates to its normal position, and in which the hydraulic cylinder unit moves the plate against the bias of said spring.

3. The improvement of claim 1 or 2 which includes a plurality of closely spaced, transversely extending, rotatable rollers defining the bottom of the baling chamber.

4. In a baling apparatus of the type which includes a wheeled frame adapted to span a windrow of hay and be moved forwardly therealong, two opposed disks rotatably mounted at the sides of said frame to define the sides of a baling chamber and confine the ends of a forming bale, means in said chamber for forming the windrow into a spiral bale as the apparatus is moved forwardly, said means including endless means which has a lower bale rolling run that may contact hay in the chamber and roll it forwardly, said endless means in said lower run having its sides supported upon said disks, and means for releasing a finished bale for discharge from said chamber, the improvement comprising, in combination:

one of said disks comprises an outer disk member on which a side of the endless means is supported, and an inner disk member which confines an end of the bale;

supporting means mounted on the frame and supporting said inner disk member for lateral translatory movement;

and power means mounted on the frame and operative to move said inner disk member laterally outwardly from a normal position to reduce confining force on the sides of the bale at the time of bale discharge, and to return said inner disk member to said normal position after a bale is discharged.

5. The improvement of claim 4 in which the supporting means comprises an outer cylindrical housing fixed to the frame, a first sleeve journalled in the housing and fixedly supporting said outer disk member, and a second sleeve which is integral with said inner disk member and which is telescoped into said first sleeve, and in which the power means comprises a hydraulic cylinder unit which has a fixed cylinder and a piston rod that extends axially into the second sleeve and has a thrust block and bearing assembly at its free end that rotatably supports an end portion of the inner sleeve and engages with parts of said inner disk member to move said inner disk member laterally.

6. The improvement of claim 5 in which the outer cylindrical housing has an axial extension in which the hydraulic cylinder unit is housed.

7. The improvement of claim 4 which includes a plurality of closely spaced, transversely extending rotatable rollers defining the bottom of the baling chamber.

* * * * *